United States Patent Office 3,288,664
Patented Nov. 29, 1966

3,288,664
PROCESS FOR BONDING OF POLYAMIDES TO METAL
Manfred Hoppe, Chur, Switzerland, assignor to Inventa A.G. fur Forschung und Patentverwertung, Zurich, Switzerland
No Drawing. Filed Sept. 25, 1962, Ser. No. 226,157
Claims priority, application Switzerland, Sept. 27, 1961, 11,243/61
3 Claims. (Cl. 156—310)

The invention relates to the bonding of polyamides of the nylon type to metals.

When polyamides are cemented or bonded to each other, most frequently a so-called resorcinol adhesive is used with satisfactory results. These adhesives consist of solutions of polyamides in resorcinol. However, when polyamides are bonded to metal with this type adhesive the results are unsatisfactory. For bonding of metal to metal, very effective adhesives are epoxy resins in the presence of suitable hardeners. It also had been suggested to use epoxy resins with such modifiers as, e.g., are known as "Versamids" (registered trademark, General Mills, Inc.), as hardeners, and, under certain conditions, together with polyamide powders, for cementing polyamide plastics to metals. However, a satisfactory bond cannot be obtained thereby when the bonded joint or seam later is to be subjected to loads, strains or stresses. Whereas the adhesion on the metal side is very good, that on the side of the polyamides is insufficient.

It now has been found unexpectedly that polyamides can be bonded to metals faultlessly and with surprisingly good results, if the metal is coated with an epoxy resin-hardener-polyamide powder mixture, and the polyamide with a polyamide adhesive. The coated surfaces then are combined, and the resin adhesive interlayer allowed to set. Setting proceeds at room temperature, and it solely is required that the parts to be bonded are held in place. As a polyamide adhesive, a resorcinol adhesive can successfully be employed. The procedure named above is critical, as becomes evident from the fact that, upon mixing the two adhesive types named and applying them to the parts to be joined, an unsatisfactory bond is obtained, as will be shown in Example 2 below. By the bonding process according to the invention, the polyamide powder combines with the metal while simultaneously an excellent bond is produced between the polyamide and the adhesive mixture due to a solvating action of the latter on the polyamide and the polyamide powder prior to the setting of the epoxy resin component. Thereby a firm bond is established between the polyamide to be joined and the adhesive mixture.

The invention now will be further explained by the following examples. However, it should be understood that these are given merely by way of illustration, not of limitation, and that numerous changes may be made in the details without departing from the spirit and the scope of the invention as hereinafter claimed.

In the tests described in the examples, a liquid epoxy resin was used having an epoxy value of 0.50 per 100 g. The hardeners were a modified polyamide resin of the type Versamid 115 (registered trademark, General Mills, Inc., Kankakee, Ill.), and diethylene triamine. The polyamide powder was a caprolactam type nylon (nylon 6), the resorcinol adhesive a solution of nylon 6 in resorcinol.

The parts to be joined had the dimensions as shown in Table 1.

TABLE 1

| Material | Thickness (mm.) | Width (mm.) | Length (mm.) |
|---|---|---|---|
| Nylon 6 (polyamide) | 4 | 20 | 120 |
| Steel | 2.5 | 20 | 100 |

The nylon plates were pretreated by washing with trichloroethylene. The steel plates were treated the same whereby a sandblast did or did not precede the wash, as indicated in the examples.

Although the examples use the above-named materials, corresponding results can be obtained when other nylon types, e.g., nylon 66 or nylon 610, are employed as parts to be bonded as well as in the adhesives, and other metals, e.g., aluminum, brass, titanium, magnesium.

Example 1

5 g. epoxy resin (epoxy value 0.5/100 g.) were mixed intimately with 5 g. Versamid 115. A steel plate was sandblasted and washed with trichloroethylene, and a thin layer of the above mixture was applied thereto with a spatula. A polyamide plate, after washing with trichloroethylene, was pressed against the coated steel plate, and the assembly allowed to set for 8 days at room temperature. The overlap of the joint was 10 mm., and the thickness of the adhesive layer, in all instances, was 0.1 to 0.2 mm.

Example 2

A mixture of 5 g. epoxy resin (as in Example 1), 2 g. nylon 6 powder, 5 g. resorcinol adhesive and 0.5 g. diethylene triamine, was applied with a spatula, to a steel plate, after the latter had been washed with trichloroethylene. A nylon plate, also after washing with trichloroethylene, was pressed thereagainst. The overlap of the bonded surfaces was 10 mm. The adhesive layer had a thickness of 0.1 to 0.2 mm.

Example 3

5 g. epoxy resin (see Example 1), 2 g. nylon 6 powder and 0.5 g. diethylene triamine were mixed throughly and applied in a thin layer to a steel plate which had been washed with trichloroethylene. A nylon 6 plate, also washed with trichloroethylene, was coated with resorcinol adhesive and then pressed against the coated steel plate. The overlap was 10 mm. and the adhesive layer had a thickness of 0.1 to 0.2 mm.

Example 4

The procedure was the same as described in the preceding example, except that the steel plate had been sandblasted prior to the trichloroethylene wash.

Example 5

An adhesive was prepared from 5 g. epoxy resin (as in Example 1), 2 g. nylon 6 powder and 5 g. Versamid 115. This was applied to a steel plate which had been cleaned by sandblasting and washing with trichloroethylene. A nylon 6 plate was washed with trichloroethylene and then coated with resorcinol adhesive. After that the coated nylon plate was pressed against the coated metal plate. The overlap was 10 mm., the thickness of the adhesive layer 0.1 to 0.2 mm.

For the testing of the samples, 10 samples of each of the preceding examples were prepared and allowed to set at room temperature for 8 days without application of pressure.

Table 2 below shows a comparison of the different bonds obtained, the numbers corresponding to the example numbers. The figures given are the average of 10 tests. The load at break or breaking strength is defined in kg./cm.$^2$ and had been ascertained by the determination of the shear strength.

TABLE 2

| Example No. | 1 | 2 | 3 | 4 | 5 |
|---|---|---|---|---|---|
| Load at Break (kg./cm.$^2$) | 60 | 27.75 | 120.5 | 118.5 | 122.5 |

The superiority of the process according to the invention is evident from the comparison of bonding in accordance with Examples 1 and 2 with the results obtained in Examples 3 to 5, which follow the procedure of this invention.

Example 1 is an ordinary bonding process with an epoxy resin, as commonly practiced. Example 2 is an epoxy resin adhesive which contains a polyamide powder and simultaneously a resorcinol adhesive, which, in accordance with the invention, is applied separately. The results obtained in Examples 1 and 2 are poor, as compared to the other examples. Examples 3, 4 and 5 form a strong bond that not only the bonded joint, but even the nylon plate itself, breaks under the load applied. The bonds obtained according to the invention are tough and shock resistant.

I claim as my invention:

1. A process for bonding nylon to metals, which comprises coating said metals with an adhesive prepared from an epoxy resin combined with a hardener and a nylon powder; coating said nylon with an adhesive consisting of a nylon solution in resorcinol; joining the surfaces thus coated face to face, and allowing them to set.

2. A process for bonding the surfaces of nylon to the surfaces of metals, which comprises coating said metal surfaces with an adhesive prepared from an epoxy resin combined with an epoxy hardener and a nylon powder; coating said nylon surfaces with an adhesive consisting of a nylon in resorcinol; joining the coated surfaces face to face; keeping them in place without external pressure for substantially 8 days at room temperature, thus allowing the adhesives to interact and set, thereby obtaining a strong bond.

3. A process for bonding the surfaces of nylon to metal surfaces, which comprises coating said metal surfaces with an adhesive prepared from an epoxy resin having an epoxy value of substantially 0.5 per 100 g. combined with an epoxy hardener comprising diethylene, and a nylon powder; coating said nylon surfaces with an adhesive consisting of nylon in resorcinol; joining the coated surfaces face to face, the combined adhesives being present at a thickness of approximately 0.1 to 0.2 mm.; keeping the joined surfaces in place without external pressure for substantially 8 days at room temperature, thus allowing the adhesives to interact and set, thereby obtaining a strong bond.

References Cited by the Examiner

UNITED STATES PATENTS

| 2,399,184 | 4/1946 | Heckert | 161—214 X |
| 2,825,672 | 2/1955 | Koblitz et al. | 161—227 X |
| 2,999,764 | 6/1957 | Rhoads. | |

EARL M. BERGERT, *Primary Examiner.*

J. P. MELOCHE, *Assistant Examiner.*